J. F. Thomas.
Tedder

Nº 89899.  Patented May 11. 1869

Witnesses:
R. T. Campbell
J. N. Campbell

Inventor:
Jno. F. Thomas
per Mason Fenwick & Lawrence

United States Patent Office.

JOHN F. THOMAS, OF ILION, NEW YORK.

Letters Patent No. 89,899, dated May 11, 1869.

IMPROVEMENT IN HAY-SPREADERS.

The Schedule referred to in these Letters Patent and making part of the same.

*To all whom it may concern:*

Be it known that I, JOHN F. THOMAS, of Ilion, in the county of Herkimer, and State of New York, have invented a new and improved Hay-Tedding Machine; and I do hereby declare that the following is a full, clear, and exact description thereof, reference being had to the accompanying drawings, making part of this specification, in which—

Similar letters of reference indicate corresponding parts in the several figures.

Figure 1:
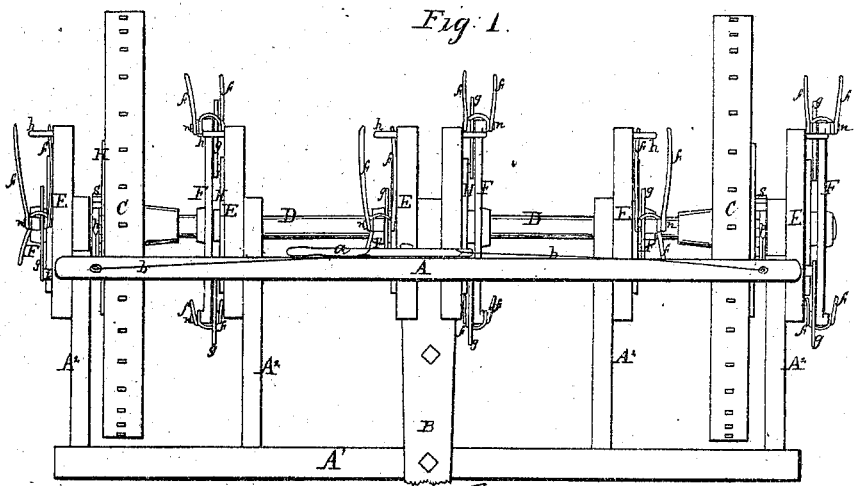
Figure 1 is a plan view of the improved machine complete.

This invention relates to certain new and useful improvements on machinery which is designed for turning and scattering grass from the swath, for curing or drying it.

The nature of my invention consists—

First, in the application to a draught-frame, which is mounted upon driving and transporting-wheels, of a series of stationary cams, in which the axle of these wheels turns freely, and in combining therewith a series of revolving arms, applied fast upon said axle, and carrying independently-revolving forks or scatterers, whose axes are parallel to the axes of the transporting-wheels, and which are directed and controlled by the said stationary cams, so as to gather, turn, and scatter the grass, during the progressive movement of the machine, as will be hereinafter explained.

Secondly, in providing for giving a quick, flirting motion to each fork, or scatterer, while acting upon the grass, and then to cause the fork to recede or incline, so as to clear itself of grass, around the reel-shaft or axle, as will be hereinafter explained.

Thirdly, in so applying an epicyclic train to one or both of the transporting-wheels of the hay-tedder, that the reel-shaft or axle of these wheels will receive a greater velocity than they receive, said train or trains being so arranged and enclosed as not to become entangled by the grass, as will be hereinafter explained.

To enable others skilled in the art to understand my invention, I will describe its construction and operation.

In the accompanying drawings, I have represented a carriage, which is adapted for having six stationary cams, E, applied to it for actuating six pairs of forks, or scatterers; but it will be obvious, from the following description, that the machine may be adapted for carrying a greater or less number of scattering-devices.

The frame of the carriage consists of an upright portion, A, which is mounted upon the longitudinal beams $A^2$ of the horizontal portion of this frame.

The front ends of beams $A^2$ are secured to a transverse beam, $A^1$, and the rear ends of those beams receive freely through them, and are sustained by the axle or reel-shaft D of two transporting-wheels, C C.

These wheels are applied upon shaft D, so that, when desired, they may be caused to turn freely thereon, or to turn this shaft.

This is done by means of an epicyclic train applied to each wheel upon axle D, so as to give a greater rotary speed to this axle than the wheels C receive.

H H represent cylindrical boxes, which are constructed with inside gear, and applied upon the axle D outside of the respective wheels C C.

To the outer side of each box H, and concentric therewith, is secured a ratchet-wheel, s, which is provided with a pawl, p, that is pivoted to one of the uprights of the frame A.

Inside of each box H are two pinion-spur wheels N P, one of which, N, is keyed on axle D, while the other wheel, P, which engages with N, and also with the teeth upon the inside of the flange of box H, has its bearing upon a stud, r, which is secured to the web or spoke of wheel C.

Thus it will be seen, that when the pawls p p are engaged with their respective ratchet-wheels s s, the boxes H H will be prevented from rotating with the shaft D, which will cause wheels C C to carry around with them the pinions P, and thus communicate a very rapid rotation to the axle D, by the action of said pinions N, which are keyed on this axle.

Figure 5:
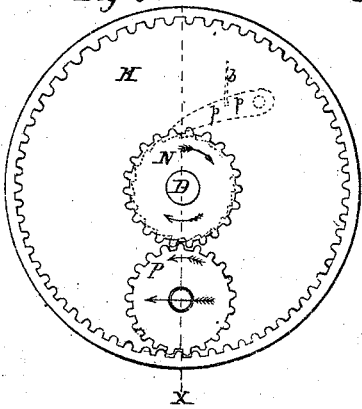
Figures 5 and 6 show the gearing for transmitting rapid motion to the reel-shaft or axle from the transporting-wheels.
Figure 6:
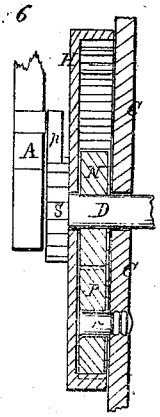

Figs. 5 and 6 show clearly the construction and arrangement of one of the multiplying-trains.

The pawls p p are pivoted to frame A, so that they will drop by the gravity of their free ends, and these pawls are connected to opposite arms of a centrally-located vibrating hand-lever, a, by means of cords b, so that a person riding upon the machine, and having hold of the lever a, can disengage both pawls from their ratchet-wheels, or engage them therewith, at pleasure.

The gearing is all enclosed within the boxes H H, and is, consequently, protected from flying grass, and confined, in a very small compass, between the outer sides of the wheels C C and the outside beams $A^2$ of the frame.

To each one of the longitudinal beams $A^2$, I secure, in a rigid manner, a cam, E, through which the shaft or axle D passes freely.

Each cam is arranged in a vertical plane, and has one side or face grooved, as will be hereinafter particularly explained, so as to give the required positions and movements to the forks f, as these forks are revolved around the axis of shaft D.

Figure 2:
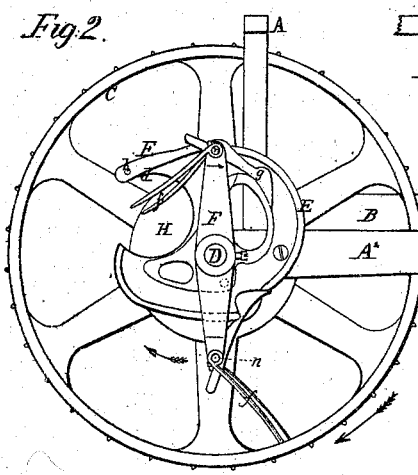
Figure 2 is an elevation of one side of the same.
Figure 3:
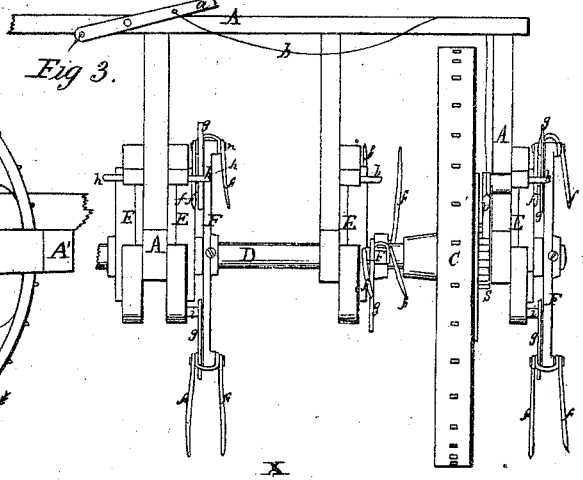
Figure 3 is a rear elevation of one-half of the machine.

Each cam is provided with two forks f f, applied to the extremities of arms F, that are keyed to shaft D, as clearly shown in figs. 1, 2, and 3.

Arms F are of equal length, and revolve in a plane parallel to the grooved face of their cam E, and they are located on the grooved side of their cam.

The forks $f\,f$ may be constructed of spring-wire, bent in any suitable shape, or left straight, and each fork is connected to its revolving arm F, by means of a pivot, $n$, whose axis is parallel to the axis of the reel-shaft or axle D.

To that end of each pivot $n$, next the grooved face of the cam E, a dog, $g$, is secured, having a stud, $i$, fastened to its longest arm, which dog plays in and is guided by the groove in said cam, as shaft D rotates in the direction indicated by the arrow in fig. 2.

Each dog, or lever $g$, is secured to its pivot $n$, at such an angle, with respect to its fork $f$, that the latter will gather upon its points and toss backward the grass, as it successively sweeps beneath its cam E, during the temporary arrest of the stud $i$ in the notch or shoulder $t$ of this cam.

The stud $i$ of each dog may be provided with an anti-friction-roller or collar, to prevent undue friction and wear.

Figure 4:
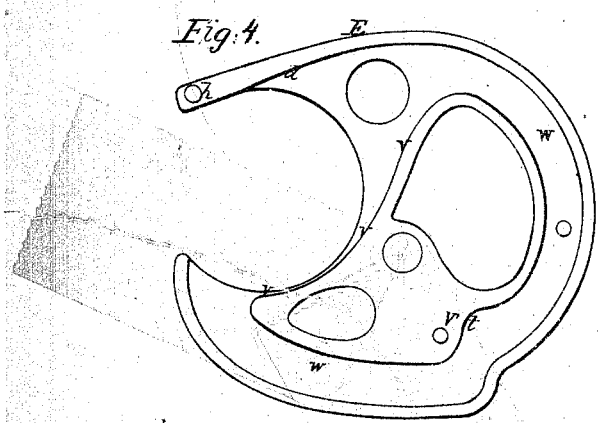
Figure 4 is an enlarged view of one of the stationary cams, which gives position and direction to the forks.

In fig. 4, I have shown the grooved face of one of the cams E, and, as all the cams are constructed precisely alike, a description of this figure will fully explain the construction of each cam.

The front portion of the groove, or way $w$ is a regular curve, slightly eccentric to the axis of axle D, and terminating downwardly in a shoulder, $t$, from which point the groove extends backward, nearly in a straight line, for a short distance, and terminates in an upturned portion, from which latter point the long arm of dog $g$ is caused to sweep forward and upward, along the concave shoulder $v\,v\,v$, to and into the upper end of groove $w$, by the short arm of dog $g$, striking a stud, $h$, on the upper rear extension $d$ of the cam.

It will be seen, by reference to fig. 2, that each cam E is provided with two forks, $f\,f$, and that while one fork is gathering and throwing the grass, the opposite one is being brought to a position for performing a similar operation.

It will be seen that each fork successively descends to its work, the curved and pointed end of the long arm of its dog $g$ will pass over a pin, $v'$, and be, for a time, arrested, by its stud $i$ catching into the notch $t$. This will cause a very rapid flirting motion to be given to the points of the fork, while the fork is acting upon the grass.

After leaving the grass, the fork ascends until the short arm of the dog $g$ strikes the stud $h$, which raises the long arm of this dog through the arc $v\,v\,v$, and brings the stud $i$ into the upper end of the slot $w$ again.

Thus it will be seen, that during every revolution of each fork about the axis of the shaft or axle D, such fork makes a revolution about its own axis of motion, to wit, its pivot $n$.

These movements, imparted to the forks, cause them to assume positions for picking up grass from the ground, flirting the grass backward and upward, and then discharging any grass which might temporarily attach itself to them.

It will also be seen, that during the operation of each fork upon the grass, the joints or free ends of such fork receive a faster motion than during any other part of its revolution about the reel-shaft or axle D.

In applying a number of the fork-carrying arms, F, upon the shaft or axle D, they may be so arranged, with relation to each other, that only one or two forks of the series will operate at one time upon the grass.

It will be seen, that as the arms F revolve with axle D, the cam E' being stationary, the slide $g'$ will receive from this cam an endwise movement, during the operation of each fork upon the grass, and thereby cause the free ends of this fork to receive the greatest speed while thus acting.

As the rollers $i$ successively pass over that portion of the cam E' which is concentric to the axis of the shaft or axle D, the free ends of the forks will receive the least speed.

I am aware that spring fork-tines have been constructed, with coils formed on their ends, to afford considerable elasticity, and, therefore, I do not claim, broadly, a coiled spring-tooth or fork, made as shown in Figures 7 and 8.

Having thus fully described my invention,

What I claim herein as new, and desire to secure by Letters Patent, is—

1. The stationary cams E, constructed substantially as described, for giving the positions and motions, as specified, to forks $f$, which turn upon axes parallel to the axis of the reel or shaft D, substantially as shown and set forth.

2. The stationary gear-box H, the intermediate pinion P, and the central pinions N, constructed and operating as described, in combination with the wheel C of the carriage, and with the tedder-arms and tines, for the purpose described.

3. The stationary pawl $s\,s$, in combination with the tedder-arms and tines, and the carriage-wheels of the machine, substantially as described.

4. The combination of the arm, or dog $g$, fork-tines $f$, and cam E, constructed and operating substantially as described.

5. The arrangement of independently-movable forks or tines upon independent revolving arms, when the vibrating movements of the forks or tines are controlled by a stationary cam, substantially as described.

Witness my hand in the matter of my application for Letters Patent for an improved hay-tedder.

JOHN F. THOMAS.

Witnesses:
JULIUS HIRSCH,
R. T. CAMPBELL.